(12) United States Patent
Seo et al.

(10) Patent No.: US 12,494,974 B2
(45) Date of Patent: Dec. 9, 2025

(54) APPARATUS AND METHOD FOR HIGH AVAILABILITY OF VIRTUAL NETWORK FUNCTION

(71) Applicant: SAMSUNG ELECTRONICS CO., LTD., Suwon-si (KR)

(72) Inventors: Seungsoo Seo, Suwon-si (KR); Insook Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 126 days.

(21) Appl. No.: 18/232,564

(22) Filed: Aug. 10, 2023

(65) Prior Publication Data

US 2023/0403208 A1 Dec. 14, 2023

Related U.S. Application Data

(63) Continuation of application No. PCT/KR2022/002041, filed on Feb. 10, 2022.

(30) Foreign Application Priority Data

Feb. 10, 2021 (KR) ........................ 10-2021-0019456

(51) Int. Cl.
*H04L 41/40* (2022.01)
*G06N 3/0442* (2023.01)
(Continued)

(52) U.S. Cl.
CPC ........... *H04L 41/40* (2022.05); *G06N 3/0442* (2023.01); *G06N 3/08* (2013.01); *H04L 41/16* (2013.01); *H04L 43/20* (2022.05)

(58) Field of Classification Search
CPC .... G06N 3/0442; G06N 3/08; H04L 41/0663; H04L 41/16; H04L 41/40; H04L 43/0817; H04L 43/20
See application file for complete search history.

(56) References Cited

U.S. PATENT DOCUMENTS 10,419,530 B2 9/2019 Halpern et al.
10,445,117 B2 10/2019 Miller et al.
(Continued)

FOREIGN PATENT DOCUMENTS

CN 108881028 A 11/2018
KR 10-2014-0055112 A 5/2014
(Continued)

OTHER PUBLICATIONS

Kim, H., et al., "A Deep Learning Approach to VNF Resource Prediction using Correlation between VNFs", IEEE NetSoft 2019—2nd International Workshop on Emerging Trends in Softwarized Networks (ETSN), pp. 444-449, 6 pages.
(Continued)

*Primary Examiner* — Gil H. Lee
(74) *Attorney, Agent, or Firm* — Sughrue Mion, PLLC

(57) ABSTRACT

A method performed by a network device in a communication system, includes: identifying information related to a first virtual network function (VNF); identifying a first operation mode of the first VNF; and determining a second operation mode of the first VNF, based on the information related to the first VNF and a deep learning model; and determining a third operation mode of the first VNF, based on the second operation mode of the first VNF and the first operation mode of the first VNF. The first VNF is redundant with a second VNF. The third operation mode is either an active mode or a standby mode.

14 Claims, 7 Drawing Sheets

(51) Int. Cl.
*G06N 3/08* (2023.01)
*H04L 41/16* (2022.01)
*H04L 43/20* (2022.01)

(56) References Cited

U.S. PATENT DOCUMENTS

| | | | |
|---|---|---|---|
| 10,680,896 | B2 | 6/2020 | Ellappan et al. |
| 11,169,840 | B2* | 11/2021 | Miller ................ H04L 41/0895 |
| 2014/0317293 | A1 | 10/2014 | Shatzkamer |
| 2017/0134483 | A1 | 5/2017 | Miller |
| 2018/0139114 | A1 | 5/2018 | Jiang |
| 2022/0036418 | A1* | 2/2022 | Bikumala ........... H04L 41/5041 |
| 2022/0200885 | A1* | 6/2022 | Bajaj .................... H04L 41/082 |

FOREIGN PATENT DOCUMENTS

| | | |
|---|---|---|
| KR | 10-2015-0111608 A | 10/2015 |
| KR | 10-1569038 B1 | 11/2015 |
| KR | 10-20170057034 A | 5/2017 |
| KR | 10-1836214 B1 | 3/2018 |
| KR | 10-1861654 B1 | 5/2018 |
| KR | 10-2018-0126868 A | 11/2018 |
| KR | 10-2020-0063943 A | 6/2020 |

OTHER PUBLICATIONS

Cherrared, S., "Fault management of programmable multi-tenant networks" Networking and Internet Architecture [cs.NI]. Universite Rennes 1, (2020), 215 pages. https://tel.archives-ouvertes.fr/tel-03047092.

Pei, J., et al., "Two-phase Virtual Network Function Selection and Chaining Algorithm Based on Deep Learning in SDN/NFVenabled Networks", IEEE Journal on Selected Areas in Communications, (2020), 16 pages, DOI 10.1109/JSAC.2020.2986592.

Li, B., et al., "Deep-Learning-Assisted Network Orchestration for On-Demand and Cost-Effective vNF Service Chaining in Inter-DC Elastic Optical Networks" School of Information Science and Technology, University of Science and Technology of China, (2018), 12 pages.

Written Opinion (PCT/ISA/237) issued May 30, 2022 from the International Searching Authority in International Application No. PCT/KR2022/002041.

International Search Report (PCT/ISA/210) issued May 30, 2022 from the International Searching Authority in International Application No. PCT/KR2022/002041.

Notice of Patent Grant issued Sep. 19, 2025 by the Korean Intellectual Property Office in Korean Patent Application No. 10-2021-0019456.

* cited by examiner

APPARATUS AND METHOD FOR HIGH AVAILABILITY OF VIRTUAL NETWORK FUNCTION

CROSS-REFERENCE TO RELATED APPLICATIONS

This application is a by-pass continuation application of International Application No. PCT/KR2022/002041, filed on Feb. 10, 2022, which is based on and claims priority to Korean Patent Application No. 10-2021-0019456, filed on Feb. 10, 2021, in the Korean Intellectual Property Office, the disclosures of which are incorporated by reference herein their entireties.

BACKGROUND

1. Field

The disclosure generally relates to a communication system and, more particularly, to a device and a method for high availability of a virtual network function (VNF) in a communication system.

2. Description of Related Art

In general, network devices are dedicated hardware and software to perform specific network functions. That is, a network function of the network devices is provided by a combination of the dedicated hardware and software, and thus, flexibility and scalability of the network devices are limited and their operating costs are increased. For this reason, instead of the dedicated hardware and software, a network function virtualization (NFV) technology, which virtualizes a network function on software-based general-purpose hardware (e.g., commercial off the shelf (COTS)) is being considered.

SUMMARY

Provided are a device and a method for high availability of a virtual network function (VNF) in a communication system.

In addition, provided are a device and a method for adaptively coping with occurrence of a VNF failure or disaster in a communication system.

In addition, provided are a device and a method for predicting a VNF state via a deep learning model in order to reduce problems that may occur in a structure in which a VNF or a high availability controller (HAC) is redundant in a communication system.

In addition, provided are a device and a method for predicting a VNF state via an artificial intelligence algorithm when a situation in which a VNF or HAC state cannot be determined under a predetermined condition occurs in a communication system.

According to an aspect of the disclosure, a method performed by a network device in a communication system, includes: identifying information related to a first virtual network function (VNF); identifying a first operation mode of the first VNF; and determining a second operation mode of the first VNF, based on the information related to the first VNF and a deep learning model; and determining a third operation mode of the first VNF, based on the second operation mode of the first VNF and the first operation mode of the first VNF. The first VNF is redundant with a second VNF. The third operation mode is either an active mode or a standby mode.

According to another aspect of the disclosure, a network device in a communication system, includes: at least one transceiver; and at least one processor operably connected to the at least one transceiver, wherein the at least one processor is configured to: identify information related to a first virtual network function (VNF), identify a first operation mode of the first VNF, determine an second operation mode of the first VNF, based on the information related to the first VNF and a deep learning model, and determine a third operation mode of the first VNF, based on the second operation mode of the first VNF and the first operation mode of the first VNF. The first VNF is redundant with a second VNF. The third operation mode is either an active mode or a standby mode.

According to one or more embodiments of the disclosure, an operation mode of a redundant VNF In a device and a method may be determined using a deep learning model, based on data collected in real time.

According to one or more embodiments of the disclosure, a device and a method may prevent redundant VNFs from operating in a dual state.

According to one or more embodiments of the disclosure, a device and a method may ensure high availability with high reliability by repeatedly learning data generated in a VNF so as to accurately determine an operation mode of the VNF.

Advantageous effects obtainable from the disclosure may not be limited to the above-mentioned effects, and other effects which are not mentioned may be clearly understood, through the following descriptions, by those skilled in the art to which the disclosure pertains.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
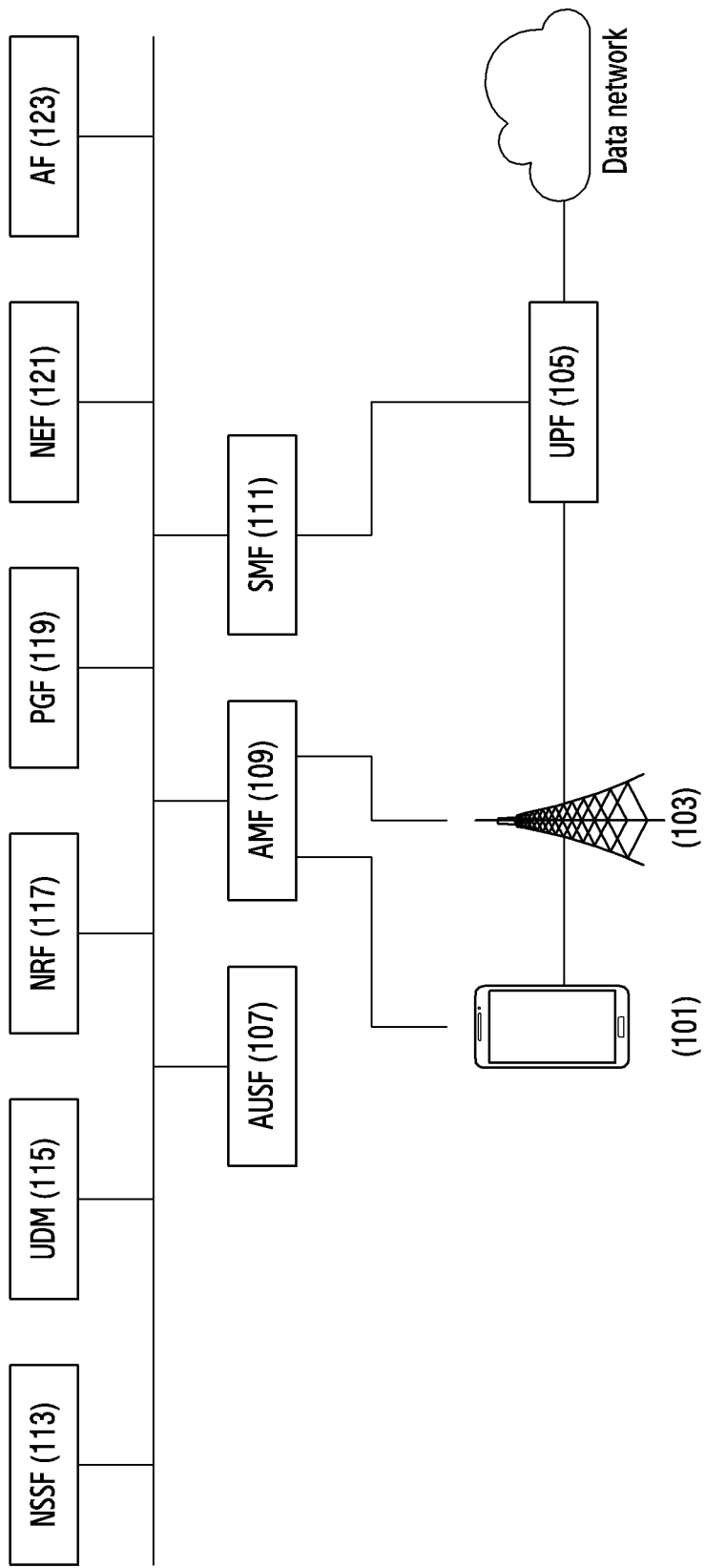
FIG. 1 illustrates a communication system according to one or more embodiments of the disclosure.

Before undertaking the detailed description below, it may be advantageous to set forth definitions of certain words and phrases used throughout the present disclosure. The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C. Similarly, the term "set" means one or more. Accordingly, the set of items may be a single item or a collection of two or more items.

The terms "-unit" etc. used hereinafter may refer to a unit configured to process at least one function or operation, and may be implemented as hardware, software, or a combination of hardware and software.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as Read Only Memory (ROM), Random Access Memory (RAM), a hard disk drive, a Compact Disc (CD), a Digital Video Disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, one or more embodiments of the disclosure will be described based on an approach of hardware. However, one or more embodiments of the disclosure include a technology that uses both hardware and software, and thus the one or more embodiments of the disclosure may not exclude the perspective of software. Furthermore, terms referring to network entities, terms referring to device elements, and the like are illustratively used for the sake of descriptive convenience. Therefore, the disclosure is not limited by the terms as used below, and other terms referring to subjects having equivalent technical meanings may be used.

In the disclosure, one or more embodiments will be described using terms defined in some communication standards (e.g., the 3rd generation partnership project (3GPP) and European telecommunication standards institute (ETSI)), but they are only for the sake of illustration. The embodiments of the disclosure may also be easily applied to other communication systems through modifications.

In the disclosure, the expression "greater than" or "less than" is used to determine whether a specific condition is satisfied or fulfilled, but this is intended only to illustrate an example and does not exclude "greater than or equal to" or "equal to or less than". A condition indicated by the expression "greater than or equal to" may be replaced with a condition indicated by "greater than", a condition indicated by the expression "equal to or less than" may be replaced with a condition indicated by "less than", and a condition indicated by "greater than and equal to or less than" may be replaced with a condition indicated by "greater than and less than".

Hereinafter, the disclosure describes a technology for increasing the availability of a redundant virtual network function (VNF) in a communication system. More specifically, the disclosure describes a technology for determining states of VNFs by using deep learning. According to a network function virtualization (NFV) technology, network function software is installed on general-purpose hardware to provide a network service, so that a service environment may be dynamically provided according to service requirements and circumstances. A communication system needs to ensure high availability so that a service is provided without interruption even when a failure occurs in a network device. In the NFV technology, in order to ensure high availability, a VNF is provisioned with multiple virtual machines (VMs) for redundancy, or a high availability controller (HAC) is used. However, there may be a case in which state information cannot be exchanged between redundant VNFs (or HACs) due to a communication disconnection, etc., or an operation mode may not be determined under a predetermined condition. Therefore, embodiments of the disclosure propose procedures, signaling, and operations for preventing a dual state and ensuring high availability even if a network device cannot determine a state of a VNF under a predetermined condition or may not determine a state of a counterpart VNF (or HAC) due to a communication disconnection, etc.

FIG. 1 illustrates a communication system according to one or more embodiments of the disclosure. FIG. 1 illustrates, as some of functions of a terminal 101, a base station 103, and a 5$^{th}$ generation (5G) core network, a user plane function (UPF) 105, an authentication server function (AUSF) 107, an access and mobility management function (AMF) 109, a session management function (SMF) 111, a network slice selection function (NSSF) 113, a unified data management (UDM) 115, a network function repository function (NRF) 117, a policy control function (PCF) 119, a network exposure function (NEF) 121, and an application function (AF) 123.

The terminal 101 may access a data network via the base station 103 and the UPF 105. In order for the terminal to transmit or receive data via the UPF 105, a packet data unit (PDU) session needs to be generated, and one PDU session may include one or more quality of service (QoS) flows. The terminal 101 may be referred to as a "terminal", a "mobile station", a "subscriber station", a "remote terminal", a "wireless terminal", a "user device", or another term having an equivalent technical meaning.

The base station 103 is a radio access network (RAN) node, and is a network infrastructure that provides radio access. The base station 103 may have coverage defined as a certain geographical area, based on a distance over which a signal may be transmitted. Hereinafter, the term "coverage" to be used may refer to a service coverage area of the base station 103. The base station 103 may cover one cell or multiple cells. Here, multiple cells may be divided according to supported frequencies and sector areas to be covered.

The AUSF 107 may provide functions for authentication of a subscriber and a network. The AMF 109 may provide functions for registration management, reachability management, connection management, and mobility management. The SMF 111 may provide functions for PDU session management, Internet protocol (IP) address assignment, and GTP-U tunnel management. The NSSF 113 may provide a function for selecting a network slice. The UDM 115 may provide a function for storing and managing subscription information of the terminal 101. The NRF 117 may provide a function for managing a network function (NF). The PCF 119 may provide a function for managing a policy related to session management and a policy related to mobility management. The NEF 121 may provide a function for providing information on a network function within a 5G system to an external network function. The AF 123 may provide a function of an application server supporting a specific service.

The functions of the core network described above may be implemented via software in general-purpose hardware instead of individual dedicated hardware by applying the network function virtualization (NFV) technology. That is, network functions may be separated from hardware so as to be virtualized. Accordingly, a network device may allocate resources (e.g., a storage space, a bandwidth, and a central processing unit (CPU)) to a VNF, and installation and removal of the resources are quick, so that scalability, adaptability, flexibility, and speed may be provided.

Although virtualization of core network functions is illustrated in FIG. 1, embodiments according to the disclosure are not limited thereto. That is, embodiments according to the disclosure may be applied to all network infrastructures, such as a router, a firewall, network address translation (NAT), a provider edge (PE), customer premises equipment (CPE), and a load balancer.

Figure 2:
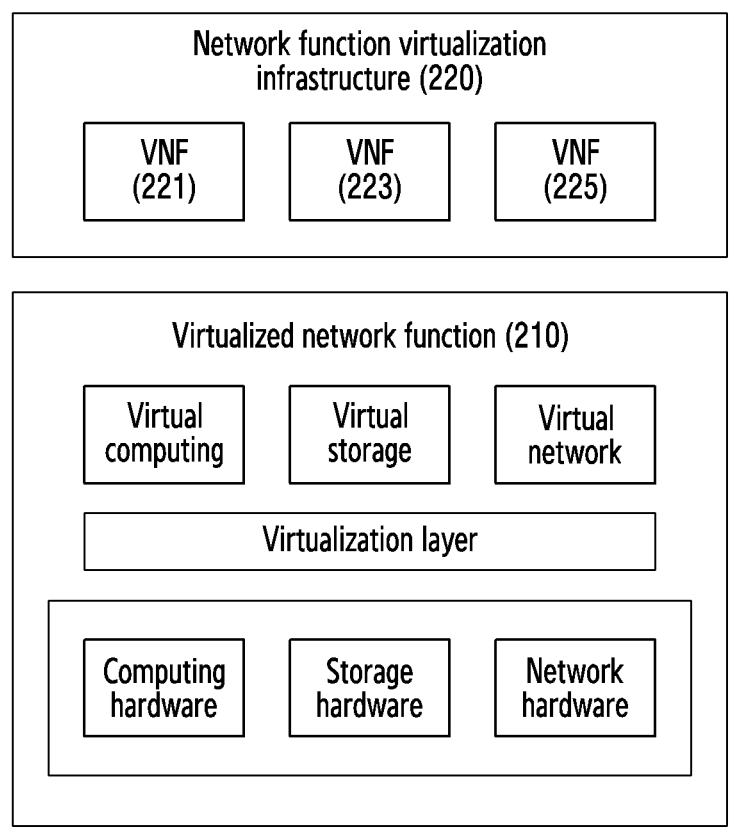
FIG. 2 illustrates a framework of network function virtualization (NFV) according to one or more embodiments of the disclosure.

FIG. 2 illustrates a framework of NFV according to one or more embodiments of the disclosure. FIG. 2 describes a network device to which the NFV technology has been applied, and this may be referred to as a network function virtualization infrastructure (NFVI).

Referring to FIG. 2, an NFV framework may include an NFVI layer and a VNF layer. The NFVI layer may include physical hardware, a virtualization layer, and a virtualization resource. The physical hardware may include computing hardware, storage hardware, and network hardware which provide processing, storage, and connectivity with respect to a VNF via the virtualization layer (e.g., a hypervisor). The physical hardware is not designed for a specific network function and may be a commercial off-the-shelf (COTS) product as a general-purpose hardware device. The virtualization layer may provide physical hardware resources to the VNF in the form of a virtual machine (VM). That is, the virtualization layer may provide virtualized computing, storage, and network resources to software (e.g., VNF) accommodated by the VM. The VNF layer may implement a network function via virtualization, and may include one or more VNFs.

A communication system may be required to ensure high availability so that a service is not interrupted. If a failure occurs in a network device or a disaster (e.g., fire, earthquake, large-scale power outage, etc.) occurs, rapid recovery is required. In order to ensure high availability using the NFV technology, VNF redundancy or a HAC may be used.

In the case of VNF redundancy, when a failure or disaster occurs in a VNF operating in an active mode, the network device may ensure high availability by switching a VNF operating in a standby mode to an active mode based on a predetermined condition. In the active mode, the network device allocates a virtualized resource for VNF via a virtual machine (VM). In the standby mode, the network device does not allocate a virtualized resource for VNF. For example, a VNF in an active mode and a VNF in a standby mode may share high availability state information via a session formed by a link connected to each other. VNFs may periodically identify or determine, via messages, occurrence of failures and state changes thereof and counterparts, determine occurrence of a failure based on a predetermined condition, and change operation modes. However, if a situation in which failure occurrence cannot be determined based on a predetermined condition occurs, or if a state of a counterpart VNF cannot be identified due to a communication disconnection, etc., a dual active or dual standby state of the VNF may occur. In particular, for a dual standby state, a service may be disconnected.

The HAC may monitor and manage states of one or more VNFs. When the HAC is used, the network device may ensure high availability even if a VNF connected to a lower level is not configured in a redundancy structure. For example, if a VNF 221 is unable to provide a service, the HAC may ensure high availability by controlling a VNF 223 or a VNF 225 to perform a function of the VNF 221. However, in order to ensure high availability of the HAC itself, there may be a limit that the HAC itself should be configured to be 'redundant' (active/standby HAC). Accordingly, if a situation in which failure occurrence cannot be determined based on a predetermined condition occurs, or if a state of a counterpart HAC cannot be identified due to a communication disconnection, etc., the service may be disconnected.

As a result, high availability of a network function cannot be ensured to a high level only by a structure of making a VNF redundant or a structure of using an HAC. Therefore, embodiments of the disclosure propose a method for increasing availability of a network function by determining and predicting a state of a VNF via learning even if a situation in which a determination cannot be made based on a scenario or a communication disconnection occurs. By estimating a state of a VNF via machine learning/deep learning, high availability with high reliability for a network function may be ensured.

Figure 3:
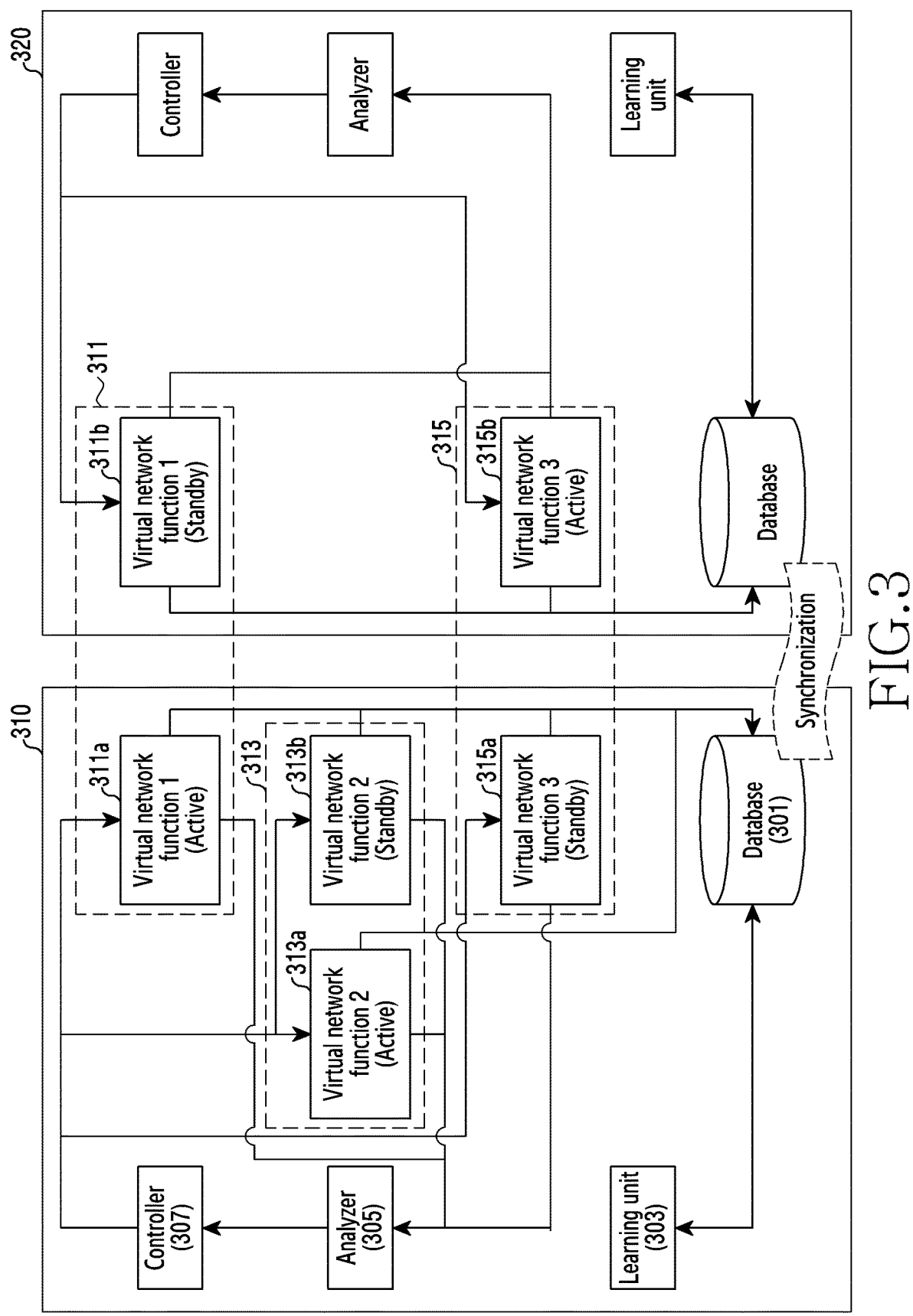
FIG. 3 illustrates a redundancy structure of a virtual network function (VNF) according to an embodiment of the disclosure.

FIG. 3 illustrates a redundancy structure of a VNF according to an embodiment of the disclosure. A redundancy structure of a VNF may include a physically separated redundancy structure and a logically separated redundancy structure. In the physically separated redundancy structure, VNFs may be 'redundant' (e.g., geo redundancy) in different network devices. For example, VNFs may be implemented, such as VNF #1 311 and VNF #3 315, in a network device 310 and a network device 320, respectively. In the logically separated redundancy structure, VNFs may be redundant (e.g., local redundancy) within one network device. For example, VNFs may be implemented, such as VNF #2 313, in the network device 310. One of the redundant VNFs may operate in an active mode, and the other may operate in a standby mode. FIG. 3 illustrates an example in which two VNFs are redundant, but this is merely an example. According to an embodiment, three or more VNFs may be redundant so that a part thereof may operate in an active mode and the others may operate in a standby mode. In addition, FIG. 3 illustrates two network devices 310 and 320, but this is merely an example. According to an embodiment, VNFs may be redundant across three or more network devices.

FIG. 3 illustrates a technique for determining an operation mode of a redundant VNF by using a deep learning model. According to an embodiment, the deep learning model may be a long short-term memory (LSTM) among recurrent neural networks (RNNs) suitable for time-series data analysis. In another embodiment, the deep learning model may be a gated recurrent unit (GRU) neural network. However, embodiments according to the disclosure are limited to neither LSTM nor GRU, and other neural networks may be applied.

Referring to FIG. 3, the network device 310 may include a database 301, a learning unit 303, an analyzer 305, and a controller 307, and the network device 310 may implement one or more VNFs.

The database 301 may store information related to a VNF. The information related to a VNF may store at least one of state information of a counterpart VNF, VNF information, VNF resource information, network packet information transmitted or received via a virtual network interface card (VNIC), and VNF failure information. The VNF information may include at least one of the number of VNFs connected to a lower level of the VNF and respective states thereof. The VNF resource information may include at least one of a usage amount of a virtual central processing unit (CPU) and a usage amount of a memory. The network packet information transmitted or received via the VNIC may include at least one of a packet length, a protocol, an Internet protocol (IP) address, a port number, and packet flow information. In addition, the database 301 may synchronize all stored data with a database of another network device 320.

The learning unit 303 may be provided with information related to a VNF from the database 301. The learning unit 303 may perform a pre-processing of the provided information. The pre-processing may include converting the provided information into a value between 0 and 1 via minimum-maximum normalization. The learning unit 303 may, based on the preprocessed information, extract a feature to be used for learning of a deep learning model and configure a data set. The data set may include a learning data set, a verification data set, and an evaluation data set. The learning unit 303 may learn the deep learning model, based on the data set. The learning unit 303 may update a criterion for determining a VNF state by incremental learning of continuously generated VNF-related information. The learning unit 303 may store a parameter of the learned deep learning model in the database 301. The parameter may include at least one of a weight and a bias. The stored parameter may be shared with another network device.

The analyzer 305 may receive information related to a VNF from the VNF (in real time). The information related to the VNF may include at least one of state information of a counterpart VNF, VNF information, VNF resource information, network packet information transmitted or received via a VNIC, and VNF failure information. The analyzer 305 may identify or determine a high availability state of the VNF, based on information related to the VNF and a determination criterion of a learned deep learning model. According to an embodiment, the analyzer 305 may identify or determine the high availability state of the VNF, based on the amount of resources currently used by the VNF. The amount of resources may include at least one of a usage amount of a virtual CPU and a usage amount of a virtual memory. For example, if the amount of resources currently used by a VNF 311*a* is less than or equal to a threshold, since the VNF 311*a* is currently operating in an active mode, the analyzer 305 may identify or determine a high availability state to be abnormal. Here, the threshold may be a criterion determined based on learning of the deep learning model. The analyzer 305 may transmit an operation mode change message to the controller 307 if the state of the VNF is identified to be abnormal. For another example, if the amount of resources currently used by the VNF 311*a* exceeds the threshold, since the VNF 311*a* is currently operating in an active mode, the analyzer 305 may identify or determine the high availability state to be normal. The analyzer 305 may monitor information related to the VNF if the high availability state of the VNF is identified to be normal.

When an operation mode change message is received from the analyzer 305, the controller 307 may change an operation mode of a VNF. For example, the controller 307 may receive an operation mode change message of the VNF 311*a* from the analyzer 305. In this case, the controller 307 may change an operation mode of the VNF 311*a* to a standby mode. According to an embodiment, the controller 307 may receive an operation mode change message of a VNF 313*a* from the analyzer 305. In this case, due to local redundancy, the controller 307 may change an operation mode of the VNF 313*a* to a standby mode, and change an operation mode of a VNF 313*b* to an active mode. That is, the network device may change an operation mode of a VNF together with an operation mode of a redundant VNF within the device, thereby preventing a dual state while concurrently ensuring high availability.

Figure 4:
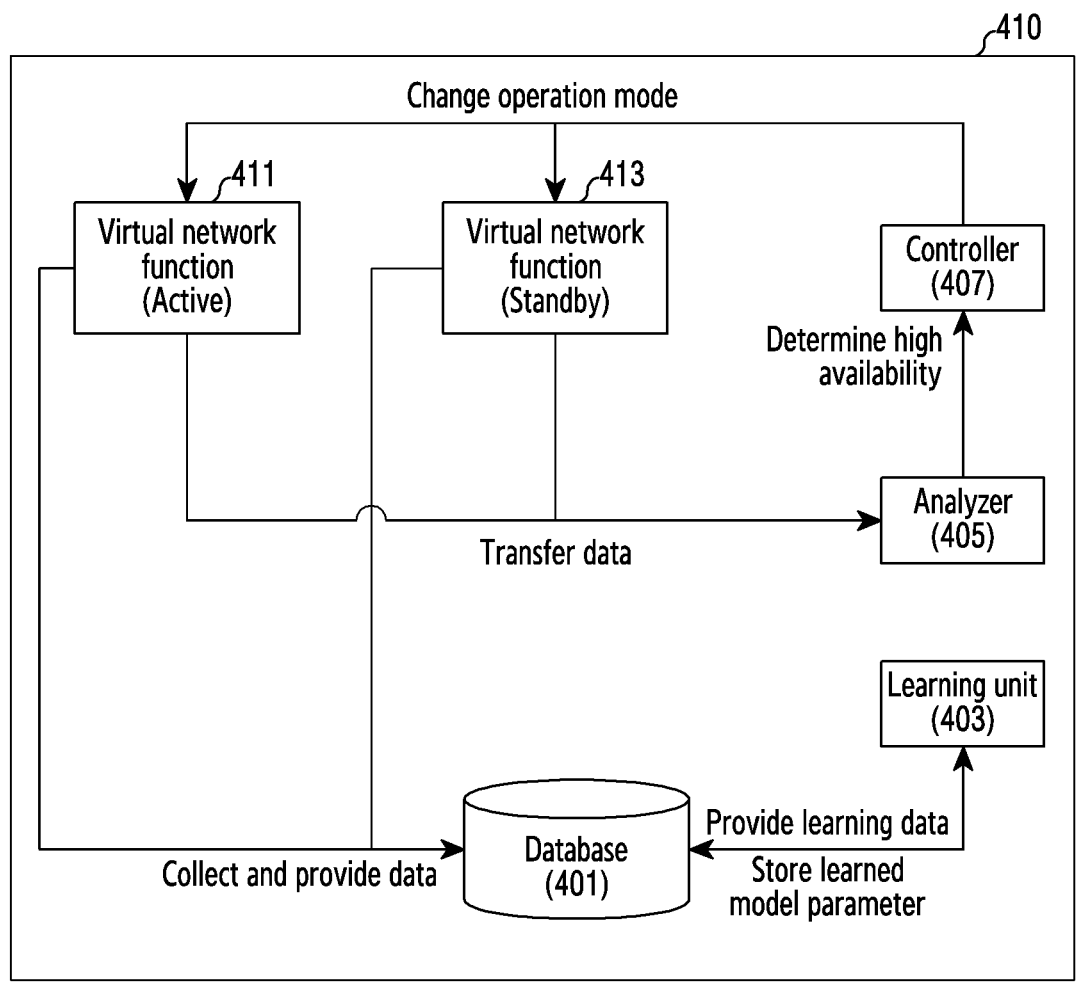
FIG. 4 illustrates a redundancy structure of a VNF according to an embodiment of the disclosure.

FIG. 4 illustrates a redundancy structure of a VNF according to an embodiment of the disclosure. In FIG. 4, a network device 410 determines an operation mode of a VNF 413 in a local redundancy structure. FIG. 4 discloses a deep learning model in which a learning unit 403 performs incremental learning based on data provided from the database 401.

An analyzer 405 may determine an operation mode of the VNF 413. The analyzer 405 may determine the operation mode of the VNF 413, based on information related to the VNF 413, which is received from the VNF 413. The information related to the VNF 413 may include at least one of state information (e.g., an active mode) of the VNF 413, state information (e.g., a standby mode) of the VNF 413, resource information of the VNF 413, network packet information transmitted or received via a VNIC, and failure information of the VNF. The resource information of the VNF 413 may include at least one of a usage amount of a virtual central processing unit (CPU) used by the VNF 413 and a usage amount of a memory. The network packet information transmitted or received via the VNIC may include at least one of a packet length, a protocol, an Internet protocol (IP) address, a port number, and packet flow information. The analyzer 405 may identify or determine an estimated state (e.g., an active mode) of the VNF 413, based on the received information related to the VNF 413 and the deep learning model. That is, the estimated state of the VNF 413 may be identified using the information related to the VNF 413 as an input of the deep learning model.

According to an embodiment, the network device may identify or determine the estimated state of the VNF, based on the amount of resources currently used by the VNF. For example, if the amount of resources currently used by the VNF exceeds a threshold, the network device may identify or determine the estimated state of the VNF to be an active mode. For another example, if the amount of resources currently used by the VNF is less than or equal to the threshold, the network device may identify or determine the estimated state of the VNF to be a standby mode. The amount of resources may include at least one of a usage amount of a virtual CPU and a usage amount of a virtual memory. Here, the threshold may be determined based on learning of the deep learning model.

According to an embodiment, the network device may identify or determine the estimated state of the VNF, based on the amount of packets related to the VNF, which are currently transmitted or received via the VNIC. For example, if the amount of packets related to the VNF, which are currently transmitted or received via the VNIC, exceeds the threshold, the network device may identify or determine the estimated state of the VNF to be an active mode. For another example, if the amount of packets related to the VNF, which are currently transmitted or received via the VNIC, is less than or equal to the threshold, the network device may identify or determine the estimated state of the VNF to be a standby mode. Here, the threshold may be determined based on learning of the deep learning model.

The analyzer 405 may identify or determine the current state (e.g., a standby mode) of the VNF 413. The analyzer 405 may determine the operation mode of the VNF 413, based on the estimated state of the VNF 413 and the current state of the VNF 413. For example, if the estimated state of the VNF 413 and the current state of the VNF 413 do not match, the analyzer 405 may determine to change the operation mode of the VNF 413, and transmit an operation mode change message to the controller 407. For example, if the estimated state of the VNF 413 and the current state of the VNF 413 match, the analyzer 405 may determine not to change the operation mode of the VNF 413, and may monitor information related to the VNF 413, which is received from the VNF 413.

The controller 407 may change an operation mode of a VNF 411 and an operation mode of the VNF 413. When an operation mode change message is received from the analyzer 405, the controller 407 may change the operation modes of the VNF 411 and the VNF 413. For example, when an operation mode change message is received from the analyzer 405, the controller 407 may change the operation mode of the VNF 411 to a standby mode and change the operation mode of the VNF 413 to an active mode.

Figure 5:
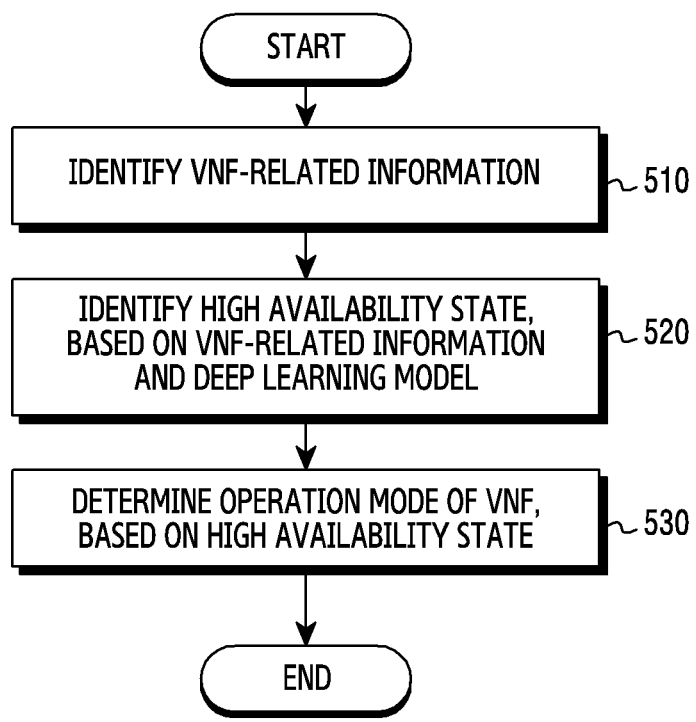
FIG. 5 illustrates an operation flow of a network device for changing an operation mode of a VNF according to an embodiment of the disclosure.

FIG. 5 illustrates an operation flow of a network device for changing an operation mode of a VNF according to an embodiment of the disclosure.

In operation 510, a network device may identify or determine information related to a VNF. The information related to the VNF may be information collected from the VNF. The information related to the VNF may include at least one of state information of a counterpart VNF, VNF information, VNF resource information, network packet information transmitted or received via a VNIC, and VNF failure information. The state information of the counterpart VNF may be information relating to an operation mode of a VNF implemented in another network device in a case of geo redundancy. The VNF information may be information relating to the number of VNFs implemented in the network device and respective operation modes in a case of local redundancy. The VNF resource information may include at least one of a usage amount of a virtual central processing unit (CPU) used by the VNF and a usage amount of a memory. The network packet information transmitted or received via the VNIC may include at least one of a packet length, a protocol, an Internet protocol (IP) address, a port number, and packet flow information.

In operation 520, the network device may identify or determine a high availability state of the VNF. The network device may identify or determine the high availability state, based on the information related to the VNF and the deep learning model. The network device may identify or determine the high availability state of the VNF, based on a current operation mode of the VNF and an estimated operation mode of the VNF. The estimated operation mode of the VNF may be identified based on the information related to the VNF and the deep learning model. If the current operation mode of the VNF and the estimated operation mode of the VNF match, the network device may identify or determine that the high availability state of the VNF is normal. If the current operation mode of the VNF and the estimated operation mode of the VNF do not match, the network device may identify or determine that the high availability state of the VNF is abnormal.

In operation 530, the network device may determine an operation mode of the VNF. The network device may determine the operation mode of the VNF, based on the high availability state of the VNF. If the high availability state of the VNF is normal, the network device may maintain monitoring of the information related to the VNF. The network device may change the operation mode of the VNF if the high availability state of the VNF is abnormal. In the case of redundancy with geo redundancy, the network device may change the operation mode of the VNF implemented in the network device. For example, referring to FIG. 3, if the high availability state of the VNF 311*a* is identified to be abnormal, the network device 310 may change the operation mode of the VNF 311*a* to a standby mode. In the case of redundancy with local redundancy, the network device may change the operation modes of VNFs implemented in the network device. For example, referring to FIG. 3, if the high availability state of the VNF 313*a* is identified to be abnormal, the network device 310 may change the operation mode of the VNF 313*a* to a standby mode, and change the operation mode of the VNF 313*b* to an active mode.

Figure 6:
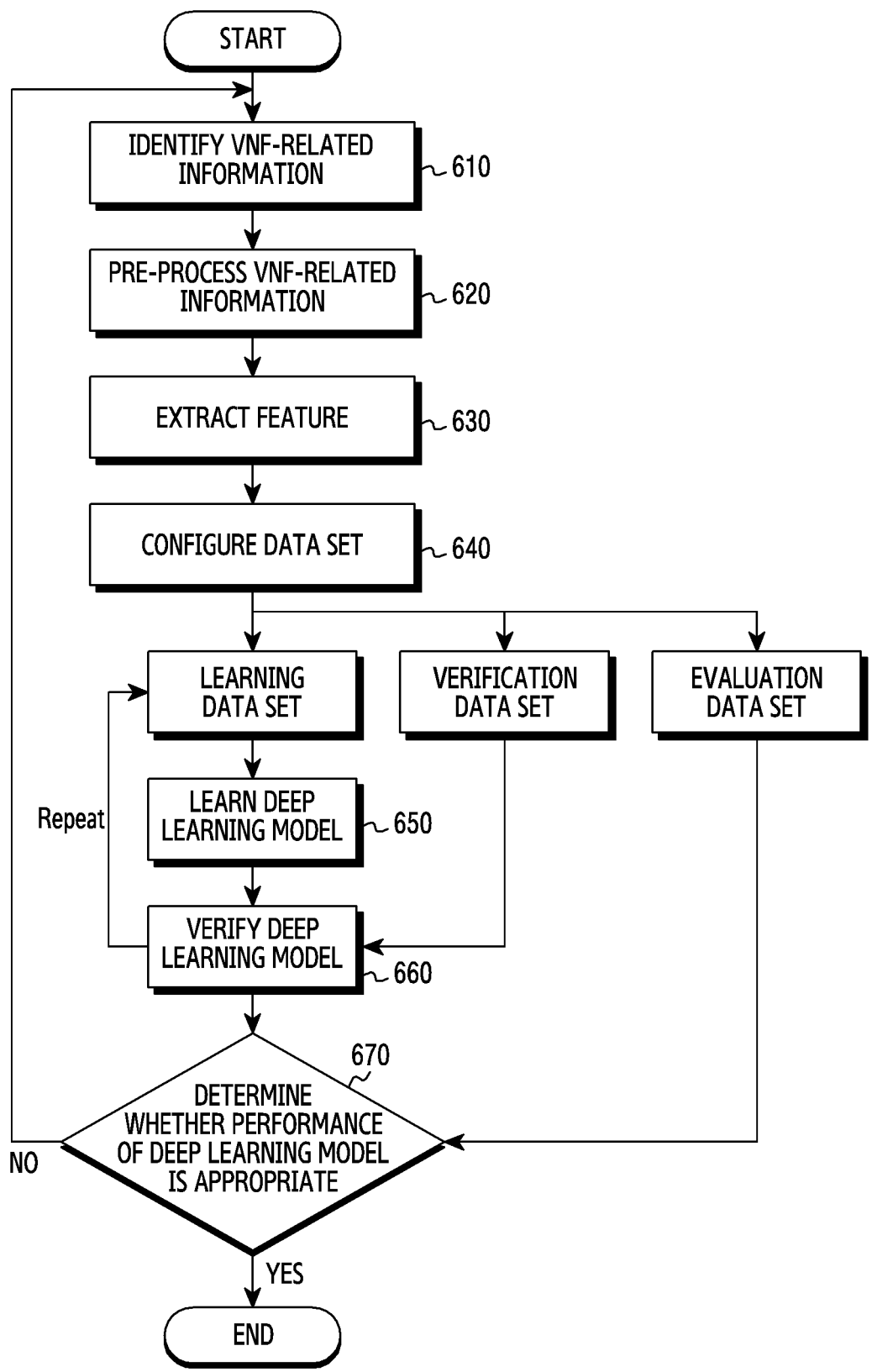
FIG. 6 illustrates an operational flow of a network device for learning a deep learning model according to an embodiment of the disclosure.

FIG. 6 illustrates an operational flow of a network device for learning a deep learning model according to an embodiment of the disclosure.

In operation 610, the network device may identify or determine information related to a VNF. The information related to the VNF may include at least one of state information of a counterpart VNF, VNF information, VNF resource information, network packet information transmitted or received via a VNIC, and VNF failure information. The state information of the counterpart VNF may be information relating to an operation mode of a VNF implemented in another network device in a case of geo redundancy. The VNF information may be information relating to the number of VNFs implemented in the network device and respective operation modes in a case of local redundancy. The VNF resource information may include at least one of a usage amount of a virtual central processing unit (CPU) used by the VNF and a usage amount of a memory. The network packet information transmitted or received via the VNIC may include at least one of a packet length, a protocol, an Internet protocol (IP) address, a port number, and packet flow information.

In operation 620, the network device may pre-process information related to the identified VNF. Pre-processing may include converting the information related to the identified VNF into a value between 0 and 1 by minimum-maximum normalization.

In operation 630, the network device may extract a feature to be used for learning of the deep learning model, based on the preprocessed information.

In operation 640, the network device may configure a data set, based on the preprocessed information. The data set may include a learning data set, a verification data set, and an evaluation data set.

In operation 650, the network device may learn the deep learning model. The network device may learn the deep learning model, based on the learning data set. In operation 660, the network device may verify the learned deep learning model. The network device may verify the learned deep learning model, based on the verification data set. The network device may repeat operations 650 and 660 one or more times, based on a verification result.

In operation 670, the network device may identify or determine whether performance of the verified deep learning model is appropriate. The network device may identify or determine whether the performance of the verified deep learning model is appropriate, based on the evaluation data set. If the performance of the verified deep learning model is appropriate, the network device may end the operation according to FIG. 6. If the performance of the verified deep learning model is not appropriate, the network device may add information related to the VNF and repeat the operation according to FIG. 6.

Figure 7:
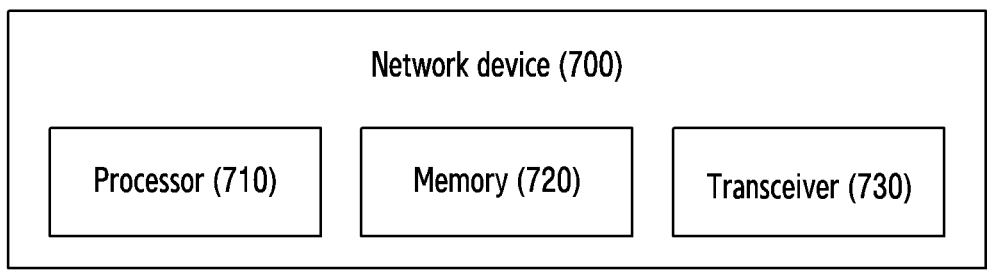
FIG. 7 illustrates a configuration of a network device according to one or more embodiments of the disclosure.

FIG. 7 illustrates a configuration of a network device according to one or more embodiments of the disclosure. Referring to FIG. 7, a network device 700 may include a processor 710, a memory 720, and a transceiver 730. The configuration illustrated in FIG. 7 may be understood as the configuration of the network devices 310 and 320 illustrated in FIG. 3.

The processor 710 may control overall operations of the network device. For example, the processor 710 may transmit and receive a signal via the transceiver 730. In addition, the processor 710 may write data to and read data from the memory 720. In addition, the processor 710 may perform functions of a protocol stack required by communication standards. To this end, the processor 710 may include at least one processor. The processor 710 may control the network device to perform operations according to the aforementioned embodiments. According to an embodiment, the processor 710 may include at least one of the learning unit 303, the analyzer 305, and the controller 307 of FIG. 3. In addition, the processor 710 may include at least one of the learning unit 403, the analyzer 405, and the controller 407 of FIG. 4.

The memory 720 may store data, such as a basic program, an application program, and configuration information, for operation of the network device. The memory 720 may include a volatile memory, a non-volatile memory, or a combination of a volatile memory and a non-volatile memory. The memory 720 may provide stored data in response to a request of the processor 710. According to an embodiment, the memory 720 may include the database 301 of FIG. 3. In addition, the memory 720 may include the database 401 of FIG. 4.

The transceiver 730 may perform functions for transmitting or receiving a signal via a wired channel or a wireless channel. For example, the transceiver 730 may perform a conversion function between a baseband signal and a bitstream according to a physical layer standard of the system. For example, when transmitting data, the transceiver 730 may generate complex symbols by encoding and modulating a transmission bitstream. In addition, when receiving data, the transceiver 730 may restore a received bitstream by demodulating and decoding a baseband signal. In addition, the transceiver 730 may up-convert a baseband signal to a radio frequency (RF) band signal, transmit the up-converted RF band signal via an antenna, and then down-convert the RF band signal received via the antenna to a baseband signal. The transceiver 730 may convert a bitstream transmitted to another network device within a network into a physical signal, and convert a physical signal received from another network device into a bitstream. To this end, the transceiver 730 may include at least one transceiver.

Via FIG. 1 to FIG. 7, descriptions have been provided for a technology for determining an operation mode of a VNF by using a deep learning model. In existing technologies related to ensuring high availability, there may occur a dual state or a service disconnection problem when a situation in which communication between redundant VNFs (or HACs) is disconnected or cannot be determined under a predefined condition occurs. On the other hand, according to embodiments according to the disclosure, a network device can accurately determine high availability states of redundant VNFs due to repeated learning of information collected by the VNFs, so that it is possible to ensure high availability with high reliability.

A method performed by a network device according to an embodiment of the disclosure as described above may include identifying information related to a first VNF, determining a current operation mode (a first operation mode) of the first VNF, determining an estimated operation mode (a second operation mode) of the first VNF, based on the information related to the first VNF and a deep learning model, and determining an operation mode (a third operation mode) of the first VNF, based on the first operation mode of the first VNF and the second operation mode of the first VNF, wherein the first VNF is redundant with a second VNF, and the third operation mode is either an active mode or a standby mode.

According to an embodiment, the information related to the first VNF may include at least one of a state of the first VNF, a state of the second VNF, resource information of the first VNF, resource information of the second VNF, packet information transmitted or received via a virtual network interface card (VNIC), failure information of the first VNF, and failure information of the second VNF.

According to an embodiment, determining of the operation mode of the first VNF may include, if the estimated operation mode of the first VNF and the current operation mode of the first VNF match, monitoring the information related to the first VNF, and if the estimated operation mode of the first VNF and the current operation mode of the first VNF do not match, changing the operation mode of the first VNF.

According to an embodiment, the deep learning model may be one of a long short-term memory (LSTM) or a gated recurrent unit (GRU).

According to an embodiment, the first VNF may be implemented by the network device, and the second VNF may be implemented by another network device.

According to an embodiment, the method may further include receiving information related to the second VNF from the another network device.

According to an embodiment, the method may include transmitting parameter information of the deep learning model to the another network device, wherein the parameter information includes information on a weight and a bias of the deep learning model.

According to an embodiment, the first VNF and the second VNF may be implemented by the network device.

According to an embodiment, the deep learning model may be acquired by repeatedly learning the information related to the first VNF.

According to an embodiment, network packet information transmitted or received via the VNIC may include at least one of a packet length, a protocol, an Internet protocol (IP) address, a port number, and packet flow information.

A network device according to an embodiment of the disclosure as described above may include at least one transceiver, and at least one processor operably connected to the at least one transceiver, wherein the at least one processor is configured to identify information related to a first VNF, identify an estimated operation mode of the first VNF, based on the information related to the first VNF and a deep learning model, identify a current operation mode of the first VNF, and identify an operation mode of the first VNF, based on the estimated operation mode of the first VNF and the current operation mode of the first VNF, wherein the first VNF is redundant with a second VNF, and the operation mode is one of an active mode or a standby mode.

According to an embodiment, the information related to the first VNF may include at least one of a state of the first VNF, a state of the second VNF, resource information of the first VNF, resource information of the second VNF, packet information transmitted or received via a VNIC, failure information of the first VNF, and failure information of the second VNF.

According to an embodiment, the at least one processor may be configured to, if the estimated operation mode of the first VNF and the current operation mode of the first VNF match, monitor the information related to the first VNF, and if the estimated operation mode of the first VNF and the current operation mode of the first VNF do not match, change the operation mode of the first VNF.

According to an embodiment, the deep learning model may be one of a long short-term memory (LSTM) or a gated recurrent unit (GRU).

According to an embodiment, the first VNF may be implemented by the network device, and the second VNF may be implemented by another network device.

According to an embodiment, the at least one processor may be configured to receive information related to the second VNF from the another network device.

According to an embodiment, the at least one processor may be configured to transmit parameter information of the deep learning model to the another network device, wherein the parameter information includes information on a weight and a bias of the deep learning model.

According to an embodiment, the first VNF and the second VNF may be implemented by the network device.

According to an embodiment, the deep learning model may be acquired by repeatedly learning the information related to the first VNF.

According to an embodiment, network packet information transmitted or received via the VNIC may include at least one of a packet length, a protocol, an Internet protocol (IP) address, a port number, and packet flow information.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to one or more embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Furthermore, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Furthermore, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof

What is claimed is:

1. A method performed by a network device in a communication system, the method comprising:
    identifying information related to a first virtual network function (VNF);
    identifying a first operation mode of the first VNF;
    determining a second operation mode of the first VNF, based on the information related to the first VNF and a deep learning model;

in case that the second operation mode of the first VNF and the first operation mode of the first VNF match, monitoring the information related to the first VNF; and in case that the second operation mode of the first VNF and the first operation mode of the first VNF do not match:

determining a third operation mode of the first VNF; and determining an operation mode of a second VNF based on the third operation mode of the first VNF;

wherein the first VNF is redundant with the second VNF, and wherein the third operation mode is either an active mode or a standby mode.

2. The method of claim 1, wherein the first operation mode is a current mode and the second operation mode is an estimated mode, and wherein the estimated mode is determined based on a threshold.

3. The method of claim 1, wherein the information related to the first VNF comprises at least one of: a state of the first VNF, a state of the second VNF, resource information of the first VNF, resource information of the second VNF, packet information transmitted or received via a virtual network interface card (VNIC), failure information of the first VNF, and failure information of the second VNF.

4. The method of claim 1, wherein the deep learning model is at least one of a long short-term memory (LSTM) or a gated recurrent unit (GRU).

5. The method of claim 1, wherein the first VNF is implemented by the network device, and wherein the second VNF is implemented by another network device.

6. The method of claim 5, further comprising receiving information related to the second VNF from the another network device.

7. The method of claim 5, further comprising transmitting parameter information of the deep learning model to the another network device, wherein the parameter information comprises information on a weight of the deep learning model and a bias of the deep learning model.

8. The method of claim 1, further comprising implementing the first VNF and the second VNF by the network device.

9. The method of claim 3, wherein further comprising acquiring the deep learning model by repeatedly learning the information related to the first VNF.

10. The method of claim 3, wherein network packet information transmitted or received via the VNIC comprises at least one of a packet length, a protocol, an Internet protocol (IP) address, a port number, and packet flow information.

11. A network device in a communication system, the network device comprising:

a transceiver;

a processor; and memory storing instructions that, when executed by the processor, cause the network device to:

identify information related to a first virtual network function (VNF), identify a first operation mode of the first VNF, determine a second operation mode of the first VNF, based on the information related to the first VNF and a deep learning model, in case that the second operation mode of the first VNF and the first operation mode of the first VNF match, monitor the information related to the first VNF, and in case that the second operation mode of the first VNF and the first operation mode of the first VNF do not match:

determine a third operation mode of the first VNF; and determine an operation mode of a second VNF based on the third operation mode of the first VNF, wherein the first VNF is redundant with the second VNF, and wherein the third operation mode is either an active mode or a standby mode.

12. The network device of claim 11, wherein the information related to the first VNF comprises at least one of a state of the first VNF, a state of the second VNF, resource information of the first VNF, resource information of the second VNF, packet information transmitted or received via a virtual network interface card (VNIC), failure information of the first VNF, and failure information of the second VNF.

13. The network device of claim 11, wherein the deep learning model is at least one of a long short-term memory (LSTM) or a gated recurrent unit (GRU).

14. The network device of claim 11, wherein the first VNF is implemented by the network device, and wherein the second VNF is implemented by another network device.

* * * * *